(12) United States Patent
Haughton et al.

(10) Patent No.: US 6,931,975 B2
(45) Date of Patent: Aug. 23, 2005

(54) CIRCULAR SAW BLADE

(76) Inventors: Keith Louis Haughton, 760 Quebec Street, Midland, Ontario (CA), L4R 1E8; Glenn Wallace Haughton, 75 Broadway Ave. Suite 414, Toronto, Ontario (CA), M4P 1V1

( * ) Notice: Subject to any disclaimer, the term of this patent is extended or adjusted under 35 U.S.C. 154(b) by 30 days.

(21) Appl. No.: 09/925,724

(22) Filed: Aug. 10, 2001

(65) Prior Publication Data

US 2003/0029297 A1 Feb. 13, 2003

(51) Int. Cl.[7] .............................................. B27B 33/08
(52) U.S. Cl. .............................. 83/853; 83/835; 83/846; 83/849
(58) Field of Search .......................... 83/838, 839, 840, 83/835, 853, 846, 849; 407/61, 62, 147, 119, 40

(56) References Cited

U.S. PATENT DOCUMENTS

| | | | | |
|---|---|---|---|---|
| 2,972,364 A | * | 2/1961 | Standal ........................ | 83/853 |
| 3,261,384 A | * | 7/1966 | Henderson .................... | 83/839 |
| 4,222,298 A |   | 9/1980 | James |   |
| 4,765,217 A | * | 8/1988 | Ludwig ........................ | 83/853 |
| 4,817,692 A | * | 4/1989 | Denis ........................... | 83/835 |
| 4,848,205 A | * | 7/1989 | Suzuki et al. ................. | 83/853 |
| 4,867,026 A | * | 9/1989 | Henning et al. .............. | 83/835 |
| 5,261,306 A | * | 11/1993 | Morey et al. ................. | 83/840 |
| 5,481,952 A | * | 1/1996 | MacLennan .................. | 83/839 |

FOREIGN PATENT DOCUMENTS

| JP | 57201121 | * 12/1982 |
|---|---|---|
| JP | 62277216 | * 12/1987 |

* cited by examiner

Primary Examiner—Stephen Choi
(74) Attorney, Agent, or Firm—Nancy E. Hill; Hill & Schumacher

(57) ABSTRACT

A circular saw blade includes a generally circular blade portion and a plurality of spaced apart teeth attached to the circular blade portion. Each tooth extends outwardly and upwardly from the circular blade portion. Each tooth has a leading edge and a dimple formed therein proximate to a leading edge. Each tooth has a positive rake. Preferably the positive rake is in a range of between about 20 and about 45 degrees.

16 Claims, 16 Drawing Sheets

CIRCULAR SAW BLADE

FIELD OF THE INVENTION

This invention relates to saw blades and in particular to circular saw blades with individual cutting teeth attached thereto.

BACKGROUND OF THE INVENTION

Circular saw blades have been in use for a long time and generally consist of a circular disk with cutting teeth formed into or attached to the periphery of the disk and a bore formed at the center of the disk to allow the mounting of the blade on the arbor of the circular saw. Very early circular saws were driven by water and steam and were massive stationary machines, but now circular saws may be portable light weight machines for easy, convenient use by a single person, Similarly, early circular saw blades were unitary blades and were manufactured from a single piece of material, generally steel, wherein the cutting teeth were formed into the steel disk and were sharpened. Today, typically circular saw blades are composite blades that are manufactured from several materials for example, a steel disk with a plurality of carbide cutting teeth attached thereto. The steel selected for the disk typically has properties such as high strength, good manufacturability and low cost and the carbide selected for the teeth typically has properties such as high hardness, high abrasion resistance and good toughness. The finished circular saw blade then has the excellent overall properties of sharp, hard teeth on an inexpensive tough disk. Generally the carbide teeth are bonded to the steel disk by means of soldering or brazing.

In operation, circular saw blades are used to cut materials such as wood. The blade is rotated often at very high speeds in excess of 160 mph at the circumference. The hard teeth engage, cut and displace the wood. The displaced wood (chips) may pile up in front of the advancing tooth in the gullet until the time that the tooth exits the work piece and the chips are thrown from the gullet. Continued rotation of the blade directs the tooth around to engage the wood; the tooth passes back through the path cut in the work piece and around further to where it engages the work piece again to repeat the process until the cut has been completed.

It was recognized by those skilled in the are that the area of contact between the blade and the work piece should be kept to a minimum. This helps to reduce the amount of friction between the blade and the work piece. This minimized contact is realized through clearance gaps and clearance angles. Accordingly, some prior art circular saw blades have been designed with these objectives in mind.

Some prior art circular saw blades include teeth that are bent outwardly from the disk, in the case of a unitary circular saw blade. Alternatively in the case of composite circular saw blades the teeth are attached to the body where the teeth have a width greater than the body. Another common feature is the bevel to the top surface of the tooth, generally one tooth being bevelled to the one side and the next tooth being bevelled to the other side in an alternating top bevel pattern popular with blades used in cross cutting wood. A tooth that does not have a bevel to its top surface has a flat top surface and is aptly called a flat top tooth popular with blades used in ripping wood. In use some of the circular saw blades described above end up having sharp points at the ends of the cutting edge and under further use these points undergo a high degree of wear and often suffer breakage in use.

One example of a prior art circular saw blade is U.S. Pat. No. 4,222,298 issued Sep. 16, 1980 to James. This patent is directed to a circular saw blade with removable and replaceable teeth. The teeth are mounted on a slight angle (negative rake angle) so as to allow clearance between the rearward portions of the teeth and/or the securing nut and for the lobes of the blade and the piece of lumber being cut. These saw blades are clearly very large blades likely adapted for use in a saw mill. Accordingly since the circular saw blade described therein is clearly directed to one with removable teeth the orientation and position of the teeth is limited and therefore James could not be adapted to position the teeth to take advantage of clearance angles and cutting angles.

SUMMARY OF THE INVENTION

The circular saw blade of the present invention includes a generally circular blade portion and a plurality of spaced apart teeth attached to the circular blade portion. Each tooth extends outwardly and upwardly from the circular blade portion. Each tooth has a leading edge and a dimple formed therein proximate to the leading edge. Each tooth has a positive rake. Preferably the positive rake is in a range of between about 20 and about 45 degrees.

It is an object of this invention to provide a composite circular saw blade that utilizes clearance gaps, clearance angles and cutting edges to increase the efficiency of the blade.

It is an object of this invention to provide a tooth for a circular saw blade that possesses a curved cutting edge and so eliminates the sharp but weak points formed on current blades.

It is another object of this invention to provide a circular saw blade that produces a smooth finish on the material being cut and in particular that the smooth finish does not display the familiar circular cross hatch pattern that commonly results from prior art circular saw blades that have sharp points at the ends of the cutting edge of the tooth.

It is another object of this invention to provide a rake angle to the curved cutting edge of the tooth and that the rake angle be provided by application of a dimple to the leading face of the tooth.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

Firstly, some of the considerations and terminology used to design the circular saw blade described herein will now be discussed. As the body of the blade, the disk, does not have to contact the work piece, it may be made of material thinner than the kerf of the saw blade. Accordingly the teeth attached to the body may have a width greater than the body.

The teeth themselves may have clearance angles to reduce the contact between the saw blade and the work piece further. A relief angle is the angle between the cutting radius (the greatest radius) and the surface immediately behind the cutting edge. A lateral clearance angle is the angle that a side of the tooth is swept toward the body of the blade behind the cutting edge such that the tooth is narrower behind the cutting edge than it is at the cutting edge. A lateral relief angle is the angle that a side of the tooth is swept toward the body of the blade below the cutting edge such that the tooth is narrower below the cutting edge than it is at the cutting edge.

Although use of these three clearance angles may improve the performance of the blade by reducing friction between the blade and the workpiece they also reduce the strength of the cutting edge by reducing the amount of material supporting the cutting edge. Accordingly improved performance must be balanced against compromised strength.

In addition to tooth clearance angles mentioned above, there are additional cutting angles used by circular saw blade teeth to affect the performance of the tooth. The inclination of the leading face of the tooth may also affect the performance of the tooth. A tooth that is swept in the direction of rotation (that is inclined in the direction of rotation) is said to have a positive rake, a tooth that exhibits no inclination is said to have no rake and a tooth that exhibits inclination opposite to the direction of rotation is said to have a negative rake. Like the bevel angle, the rake angle can be selected and applied to a tooth to influence the performance of the tooth. Generally, a given rake angle is selected for use in certain applications (e.g. cross cutting) and a different rake is applied to the teeth for use in other applications (e.g. ripping).

Figure 1:
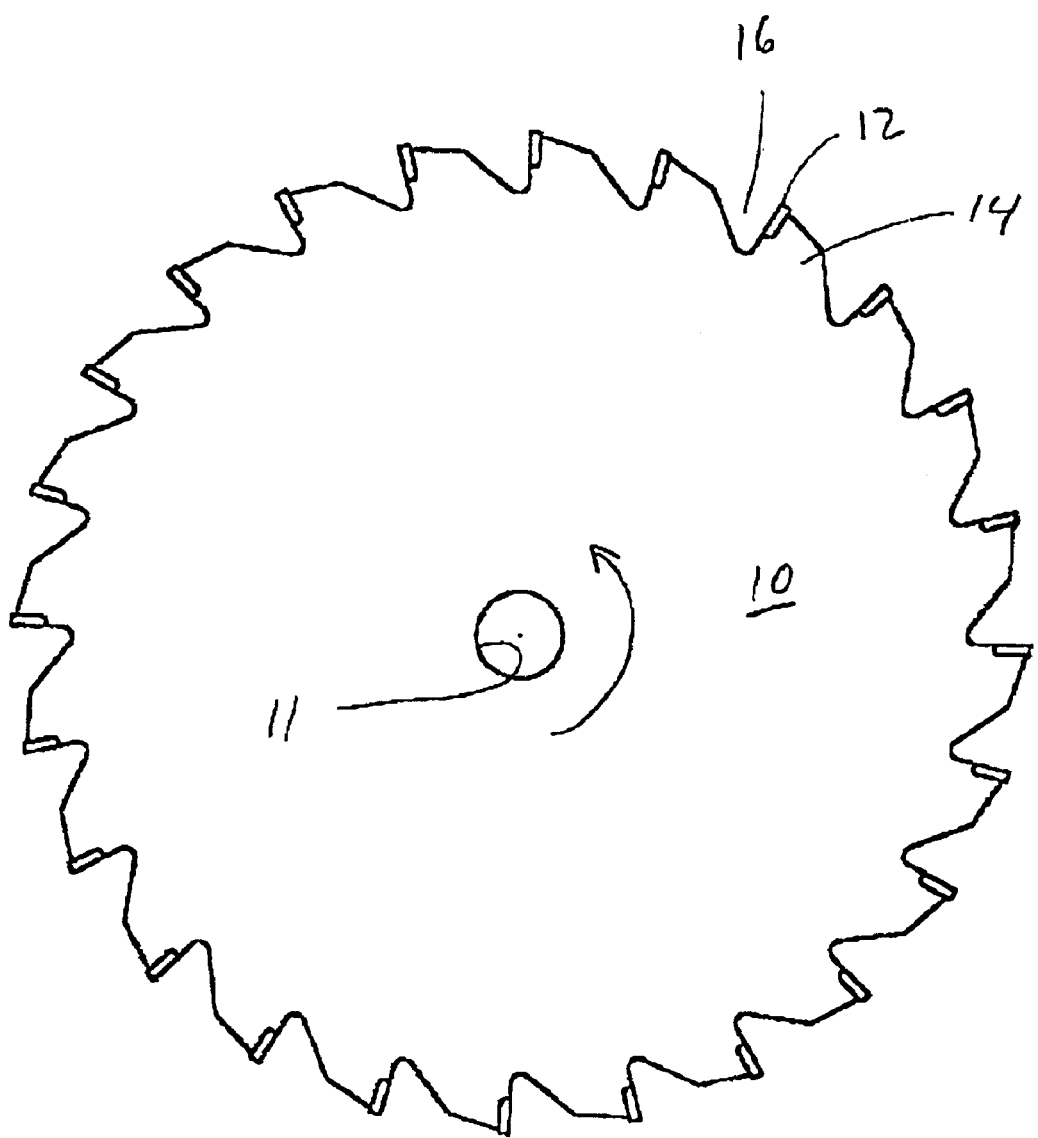
FIG. 1 is a side view of a circular saw blade of the present invention.

Referring to FIG. 1, the circular saw blade 10 has a central bore 11 and a plurality of individual cutting teeth 12 that are attached to the blade 10. Each tooth 12 is supported in the rear by a pier 14 and has a gullet 16 in front.

Figure 2:
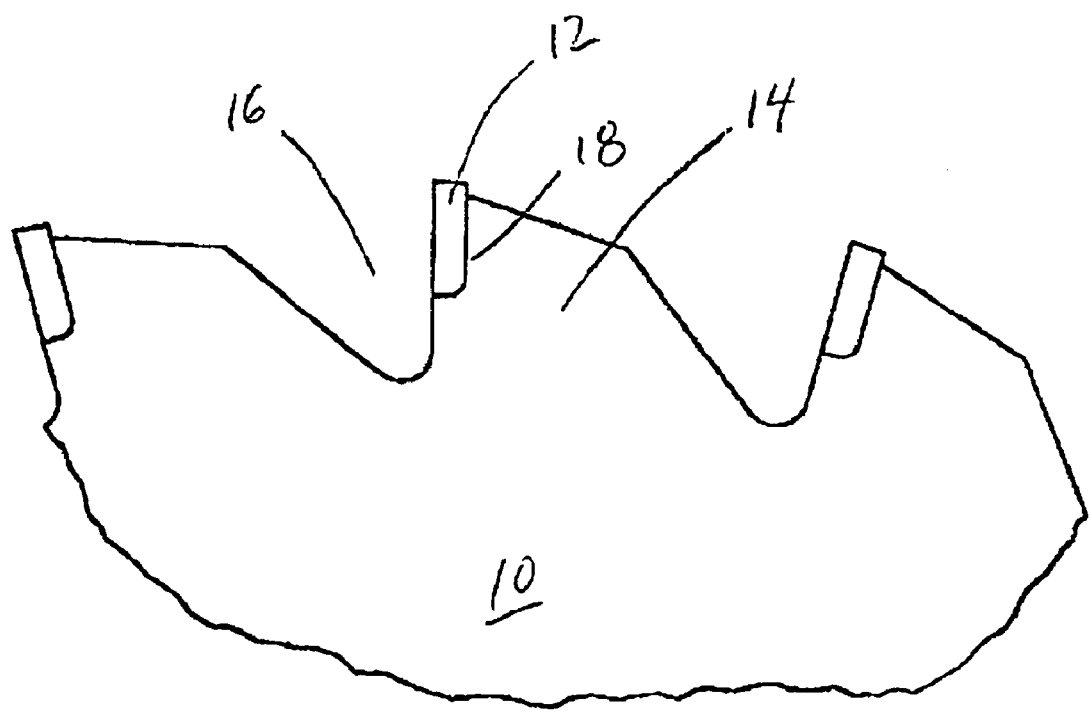
FIG. 2 is an enlarged side view of a portion of the blade of FIG. 1.
Figure 3:
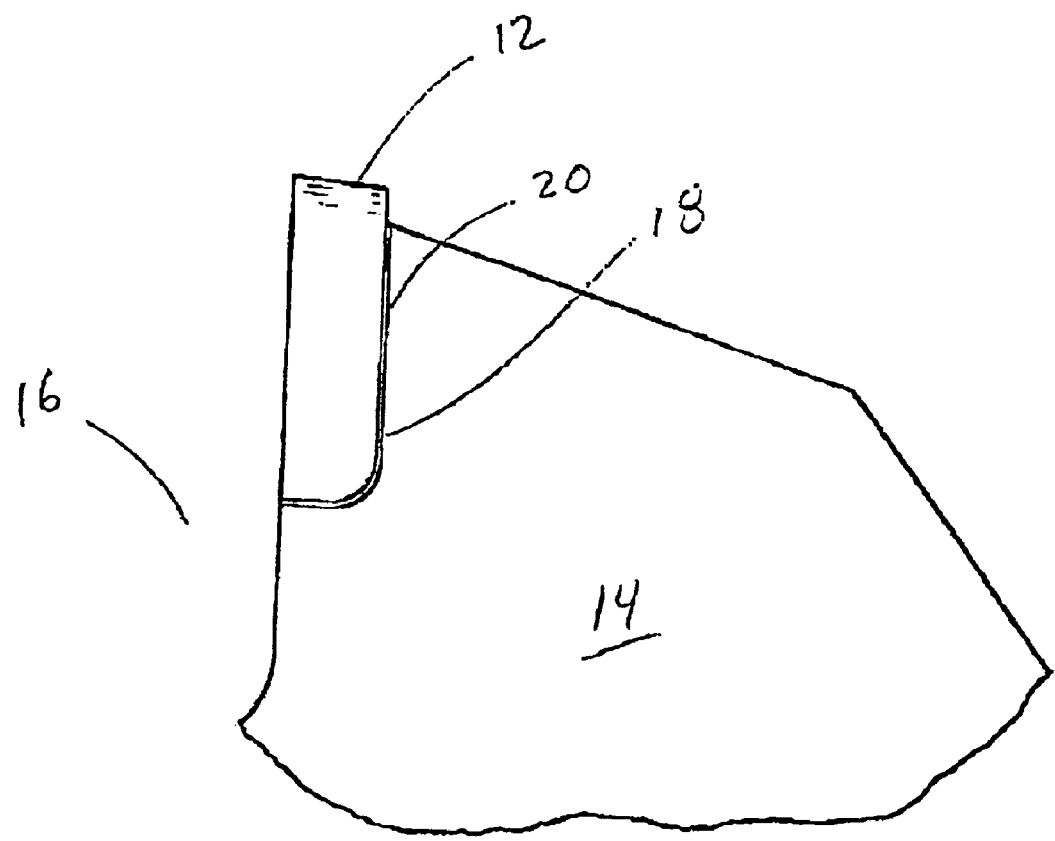
FIG. 3 is a side view of a tooth of the blade of FIG. 1.

A seat 18 is formed in the front of each pier 14 to accept, in close tolerance, the tooth 12 as best seen in FIGS. 2 and 3. Preferably, the tooth 12 is brazed in place in the seat 18. Brazing filler metal 20 fills the tight space between the tooth 12 and the seat 18.

Figure 4:
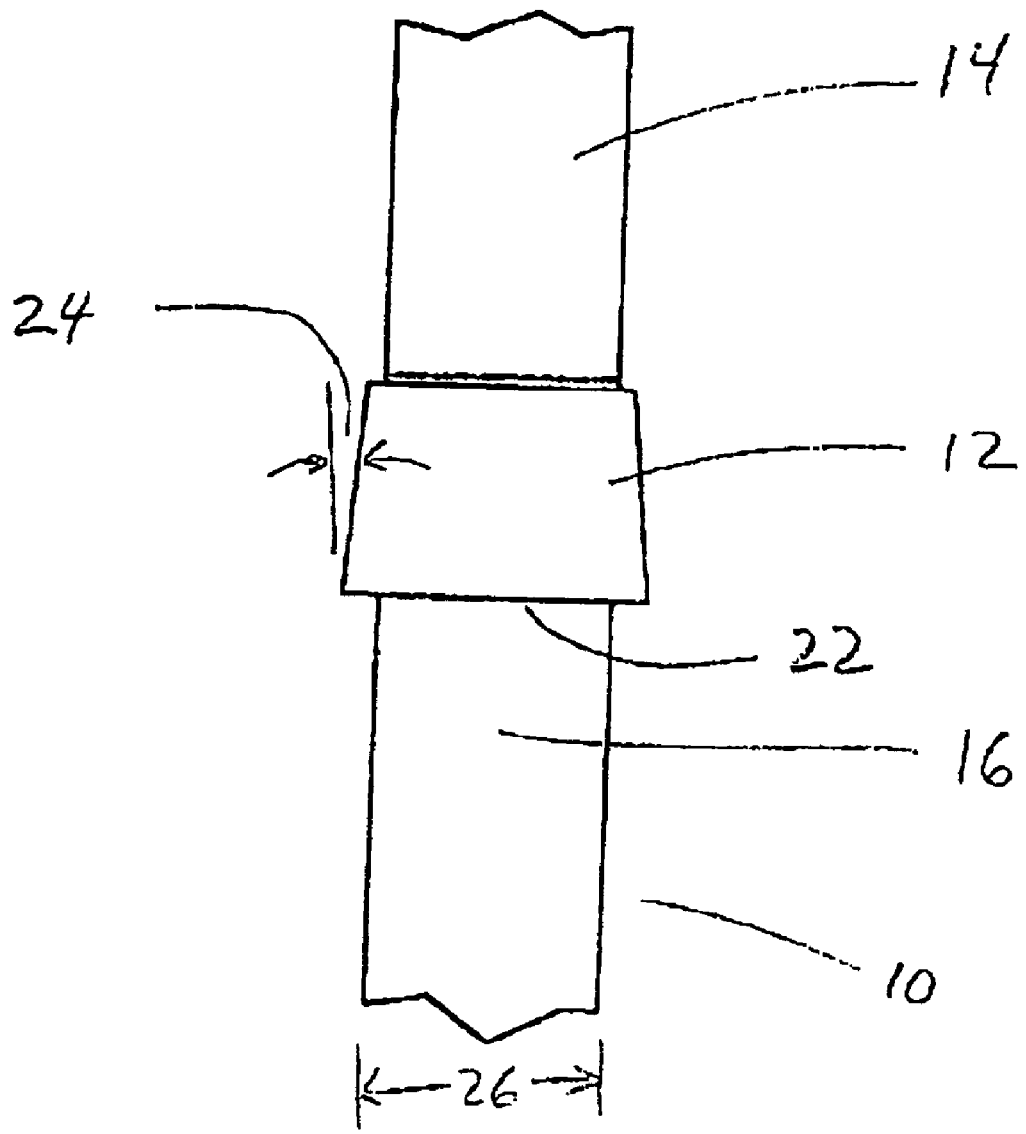
FIG. 4 is a top view of a tooth and a portion of the blade of FIG. 1.

As shown in FIG. 4, the tooth 12 has a leading edge 22 that is wider than the remainder of the tooth 12 due to the lateral clearance angle 24, Similarly, leading edge 22 is wider than the plate thickness 26 of the circular saw blade 10.

Figure 5:
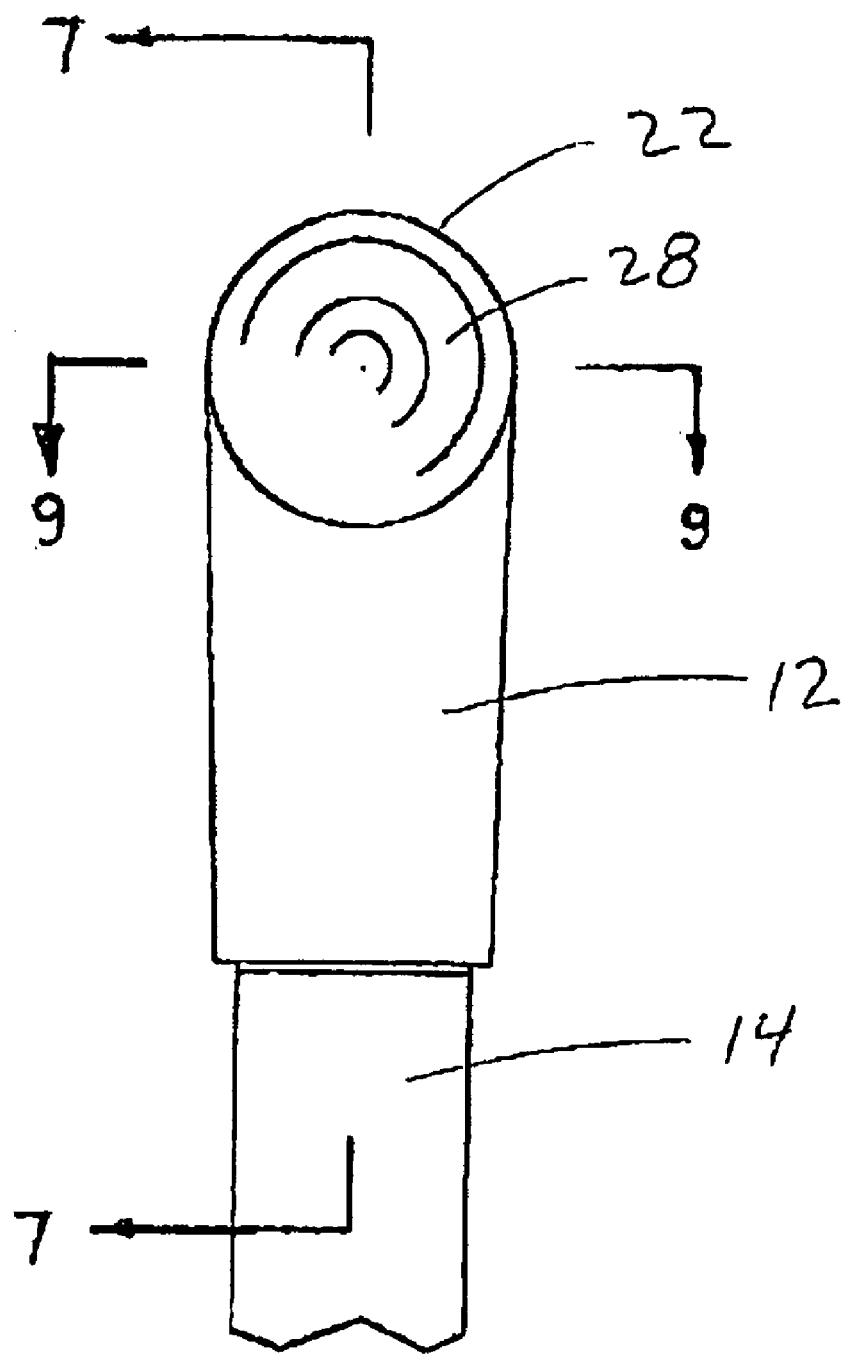
FIG. 5 is a front view of a tooth having a hemispherical dimple and curved cutting edge.
Figure 6:
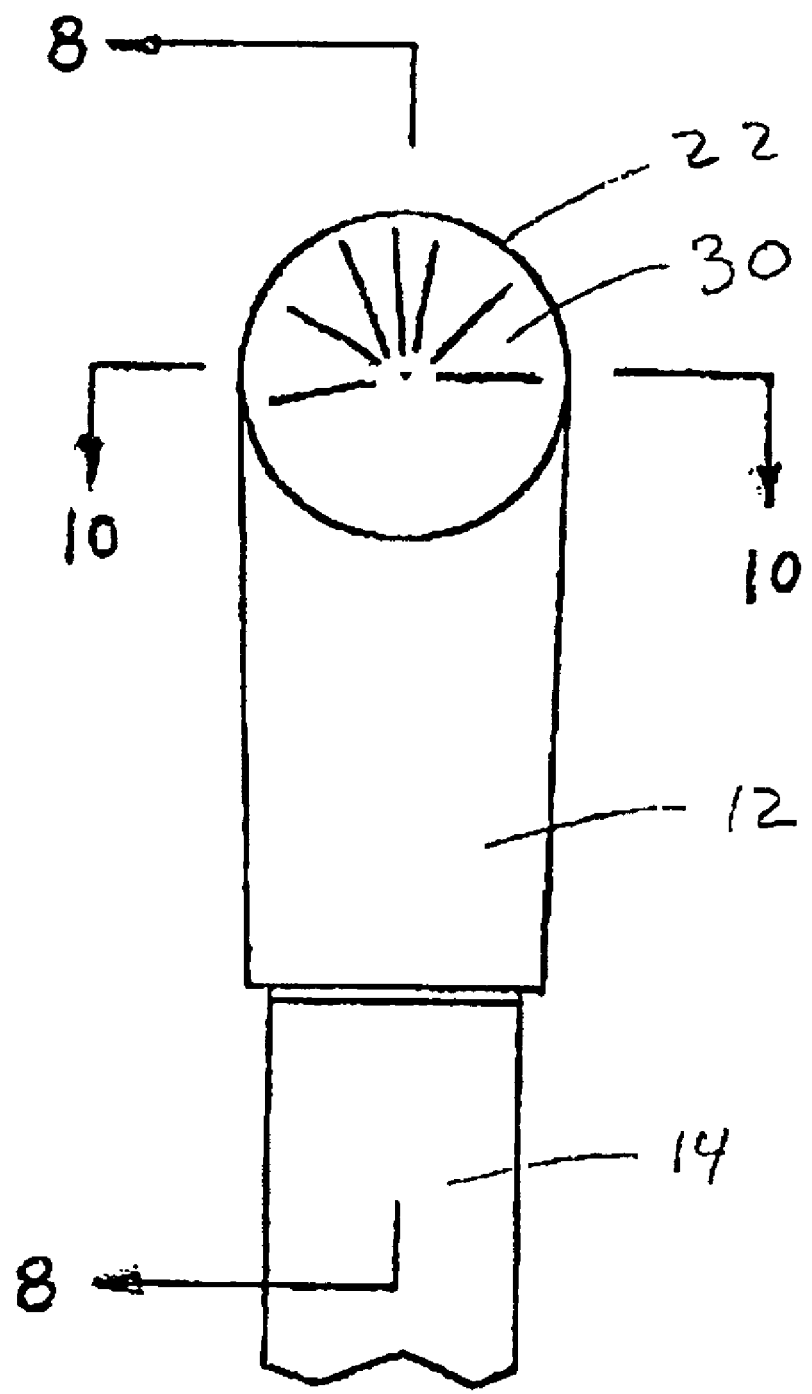
FIG. 6 is a front view of an alternate tooth having a conical dimple and curved cutting edge.
Figure 7:
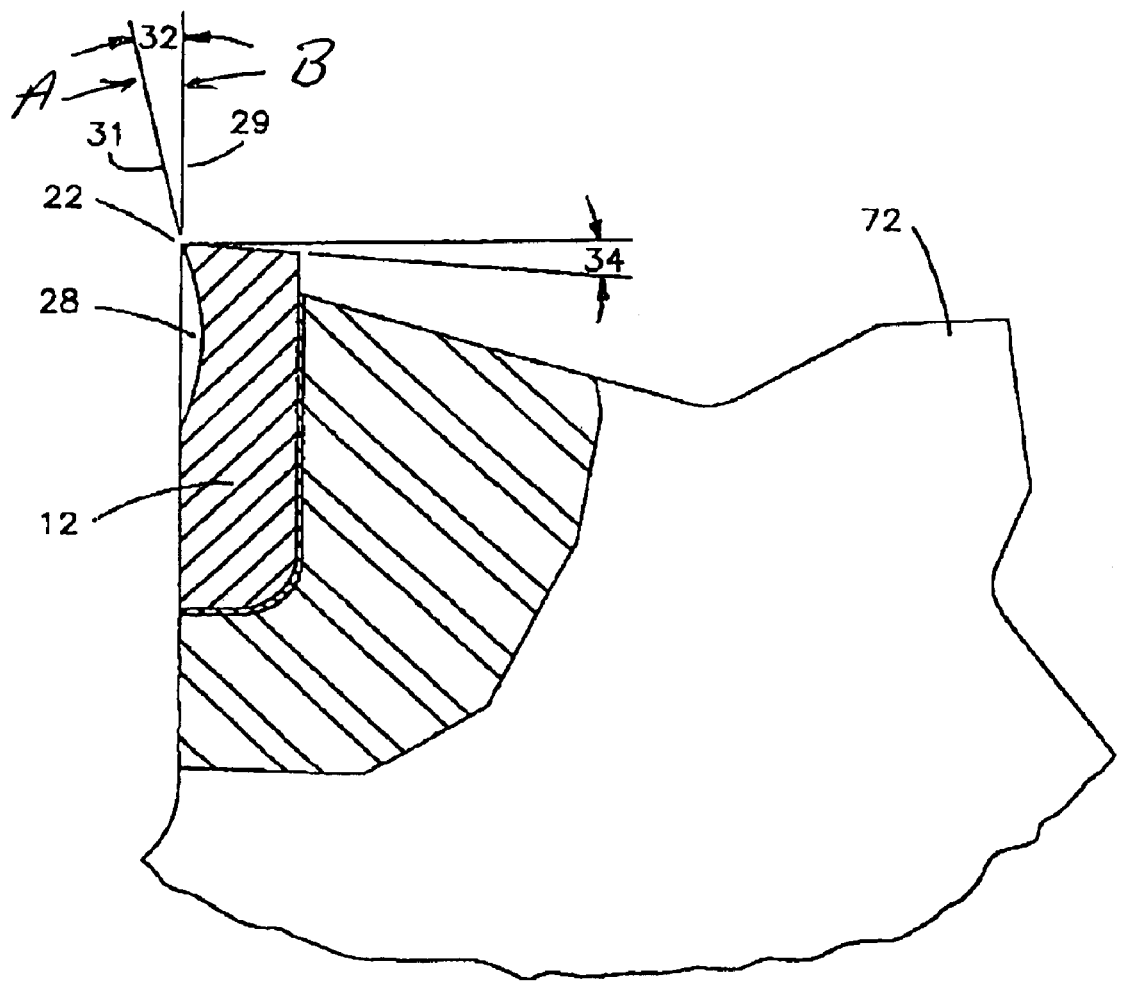
FIG. 7 is a cross section of the tooth of FIG. 5 taken on section 7—7.
Figure 8:
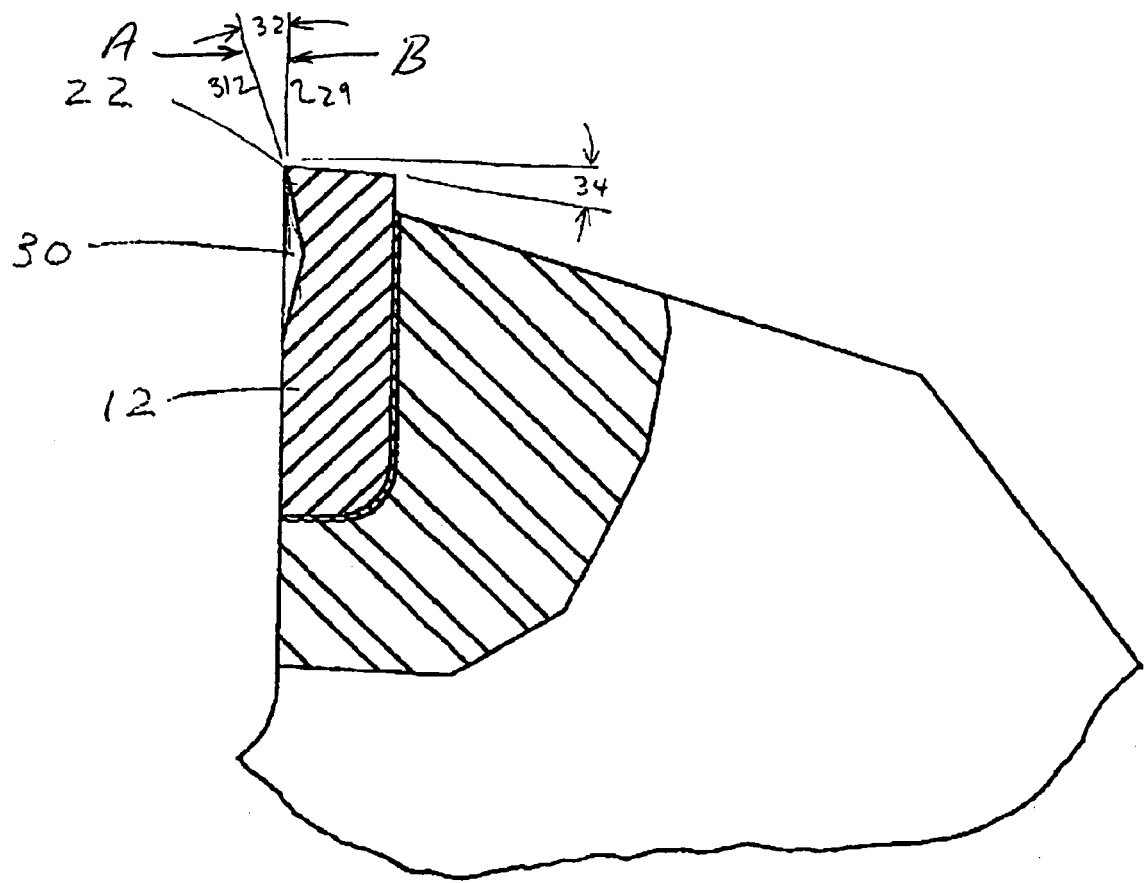
FIG. 8 is a cross section of the tooth of FIG. 6 taken on section 8—8.
Figure 9:
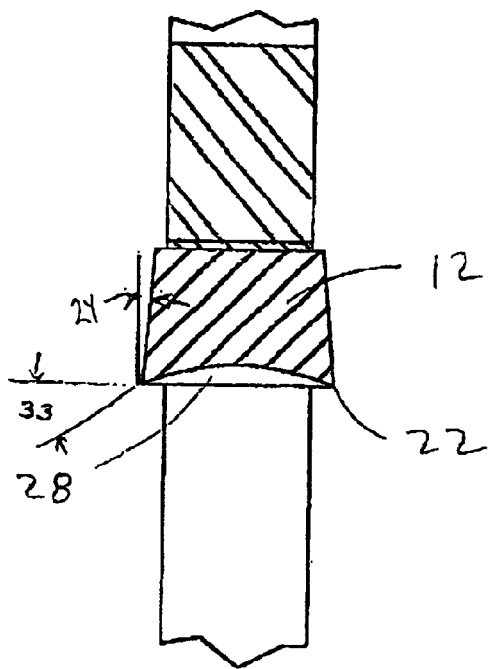
FIG. 9 is a cross section of the tooth of FIG. 5 taken on section 9—9.
Figure 10:
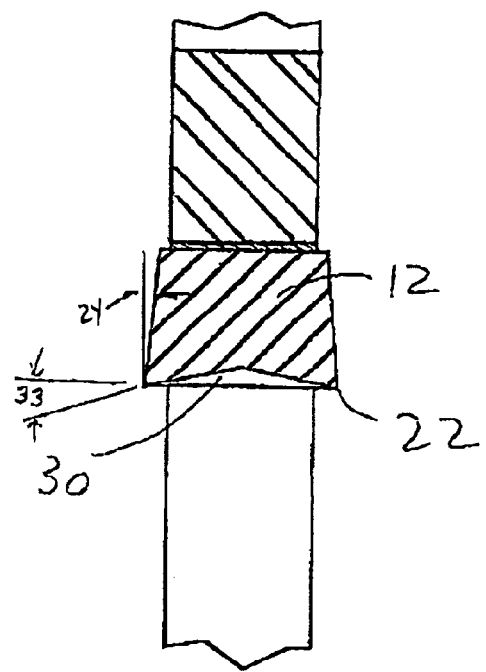
FIG. 10 is a cross section of the tooth of FIG. 6 taken on section 10—10.

As shown in FIGS. 5, 7 and 9, the front of the tooth 12 has a hemispherical dimple 28 formed proximate to the leading edge 22. Alternatively, a conical dimple 30 could be formed proximate to the leading edge 22, as shown in FIGS. 6, 8 and 10.

An anti-kickback lobe 72 is shown in FIG. 7 which is an extension of the body of the blade 10. Anti-kickback lobe 72 acts as a depth stop to limit the depth of cut that can be taken by the tooth 12. The anti-kickback lobe 72 follows behind one tooth 12 but it also leads the next tooth 12 as the blade rotates during use. In the case that an extra deep cut is attempted, by for example the operator pushing too hard on the saw, the lobe 72 would start to contact the work piece. As the lobe 72 does not offer cutting capacity to the blade 10, a limited amount of cut could be obtained, thus eliminating a condition that may cause the saw to bind in the work piece or cause the saw to overwork.

The application of either the hemispherical dimple 28 or conical dimple 30 provides a sharpness to leading edge 22 by creating a measure of positive top cutting angle 32 in either case, as shown in FIGS. 7 and 8. The top cutting angle is 32 is defined by the leading plane of the tooth 29 and a leading edge plane 31 of the dimple 28 proximate to the leading edge. Also shown in these figures, relief angle 34 provides clearance at the top of each tooth 12. As the leading edge 22 extends from one side of the tooth 12 across the top to the other side, the relief angle 34 is an extension of the lateral clearance angle 24. Although relief angle 34 and lateral clearance angle 24 are extensions of each other, the magnitude of each angle need not be the same. Tooth 12 could be made either in a die (mold) shaped for the desired angles or by machining to the desired angles.

The hemispherical dimple 28 or the conical dimple 30 provide a positive top cutting angle 32 to the leading edge 22 at the top of the tooth 12, as shown in FIGS. 7 and 8. Dimples 28 and 30 also have a positive side cutting angle 33 to the portion of the leading edge 22 that exists at the sides of the tooth 12 as shown in FIGS. 9 and 10. For the hemispherical dimple 28 or the conical dimple 30 the magnitude of the top cutting angle 32 is the same as the magnitude of the side cutting angle 33.

As shown in FIGS. 5 and 6, the leading edge 22 has a generally circular or arcuate shape and so eliminates the sharp corners that often occur on teeth. As the sharp corners experience wear on three sides and as leading edge 22 of the present invention experiences wear on only two sides it is expected that leading edge 22 of the present invention will experience a reduced rate of wear. A similar argument would apply to the strength of leading edge 22 over the strength of the corners of prior art teeth. As the leading edge 22 is supported on both sides we would expect a generally stronger, more chip resistant and fracture resistant leading edge 22 than the leading edges and corners found on prior art teeth.

Resharpening of the leading edge 22 would be achieved by grinding the inner surfaces of either the hemispherical dimple 28 or the conical dimple 30 to produce a new leading edge 22.

The parameters of the circular saw blade described herein are that the leading edge 22 has a positive rake of between about 20 and about 45 degrees and preferably the positive rake is about 40 degrees. The relief angle 34 is between about 5 and about 15 degrees and preferably is about 12 degrees. The lateral clearance angle is between about 1.5 and about 5 degrees and preferably is about 2.5 degrees, Following are a number of variations of the present invention that may facilitate the manufacturing of the circular saw blade but are still within the parameters of invention herein.

Figure 11:
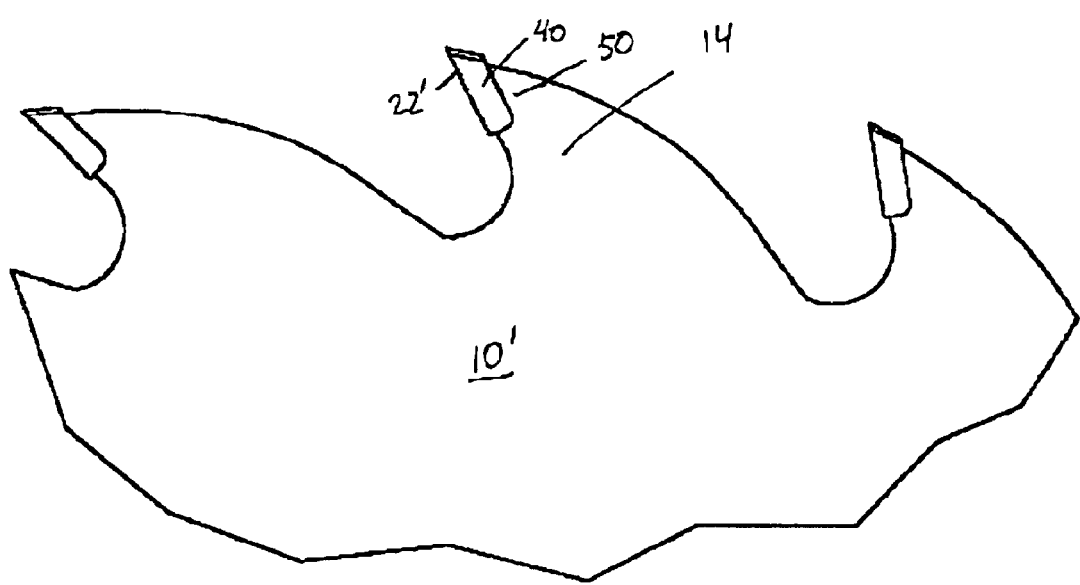
FIG. 11 is an enlarged side view portion of an alternative embodiment of the saw blade of the present invention, where the teeth are inclined forwardly.

Referring to FIG. 11, an alternative embodiment of the circular saw blade is shown having inclined teeth 40 that are attached to the body of the blade 10' in an inclined attitude. The inclination is in a forward direction, that is, inclined in the direction of rotation. The inclination of the inclined teeth 40 increases the rake angle that the leading edge 22' of each tooth has with the work piece during operation of the blade 10'. The dimple in the tooth, whether a hemispherical dimple 28, conical dimple 30 (described above), modified hemispherical dimple 42, scallop dimple 44, elongate linear three sided dimple 46 or inverse pyramid shaped dimple 48 (described below) provides some positive rake for the leading edge 22' of the inclined tooth 40. The inclination of the tooth shown in FIG. 11 provides additional rake thereby increasing cutting capacity of the blade 10' as a whole. The inclined teeth 40 are inclined forward on the blade 10 due to the inclination of the seat 50 formed in the pier 14 of each inclined tooth 40. The total rake available to the leading edge 22 of each tooth 12, 40 will be the sum of the rake provided by forward inclination of the teeth 12, 40 and the rake provided by the top cutting angle of the dimple to the front of each tooth 12, 40.

Figure 12:
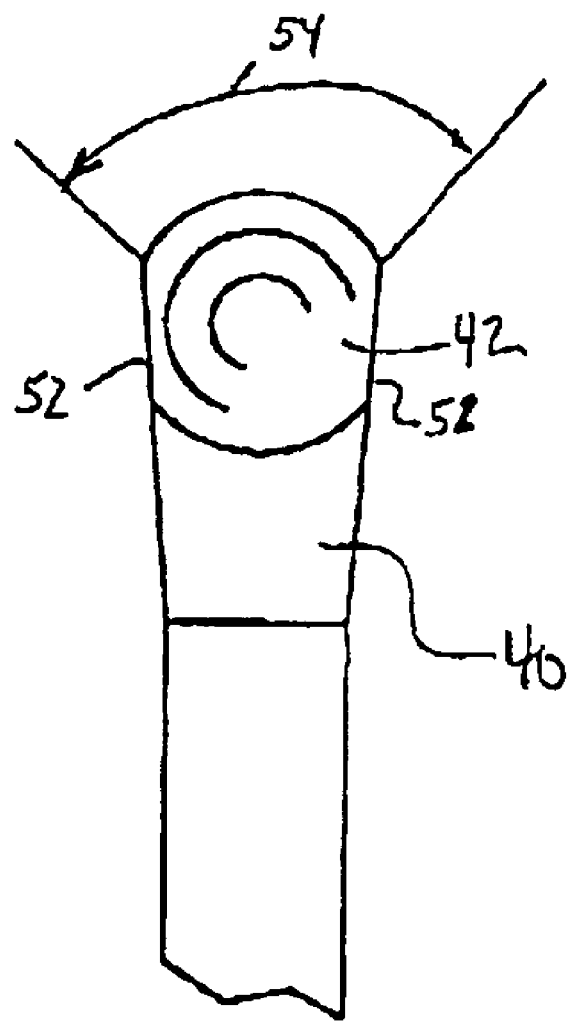
FIG. 12 is a front view of a second alternative tooth of the saw blade invention having a curved cutting edge and truncated sides.

Shown in FIG. 12 is a front view of a tooth 40 having a modified hemispherical dimple 42. This tooth is similar to that shown in FIG. 5 but its sides 52 have been modified such that they are truncated. This facilitates the manufacturing of the tooth. By reducing the angle 54 of the curved portion of each tooth 40 to less than 180 degrees, the grinding required to manufacture the curved portion is reduced. As shown in FIG. 12, angle 54 of the curved portion of the tooth 40 is only about 110 degrees and may be ground by a single pass of a formed grinding stone. The path of the grinding stone would be in the plane of the saw blade 10. Conversely if the full curved portion of the leading edge 22 of the tooth 12, shown in FIG. 5 for example is to be ground, a curved path would have to made with the path of the grinding stone being largely perpendicular to the plane of the saw blade 10.

Figure 13:
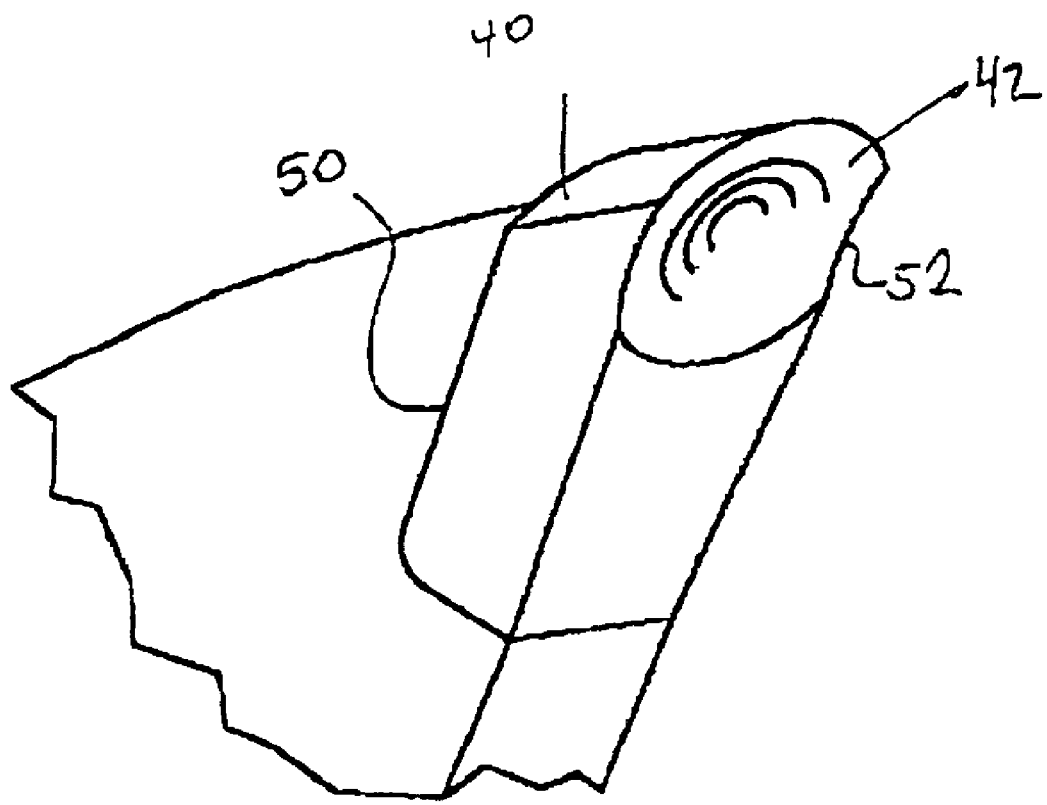
FIG. 13 is a perspective view of the second alternative saw blade tooth of FIG. 12.

Shown in FIG. 13 is the saw blade tooth 40 as shown in FIGS. 11 and 12 that has had its sides 52 reduced and has also been inclined forward. The seat 50 has been formed into the body of the blade 10 such that the tooth 40 has a tilted forward attitude. The tilted forward attitude of the tooth 40 provides additional rake to that already provided by the application of the dimple 42 to the front of the tooth 40. The increased rake provided by both the dimple 42 and the tilted forward attitude of the tooth 40 causes leading edge 22 to be particularly sharp, and so will provide effective cutting action during operation of the blade 10.

Figure 14:
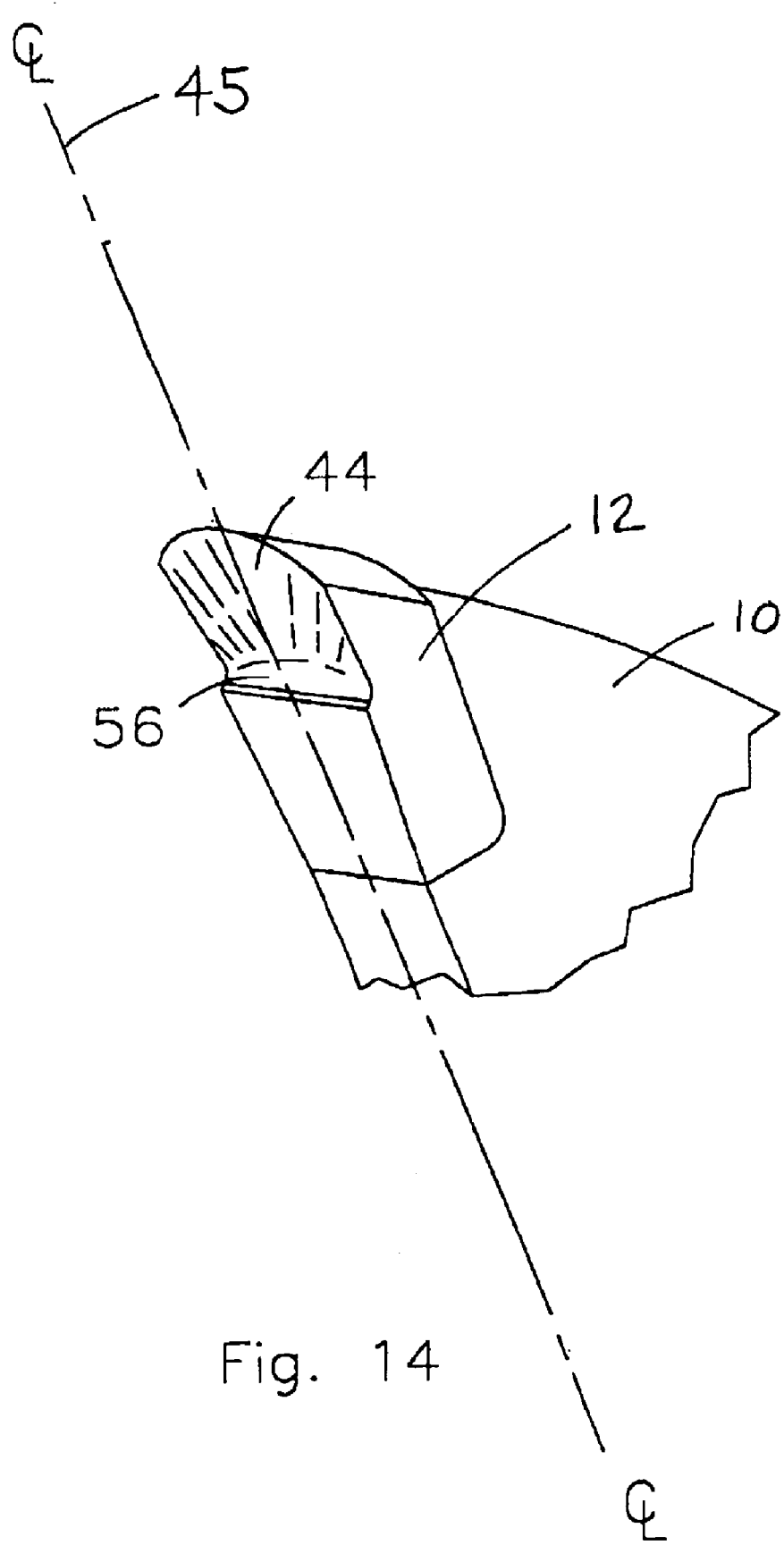
FIG. 14 is a perspective view of a third alternative saw blade tooth of the present invention having a scalloped shaped dimple and an arcuate leading edge.
Figure 15:
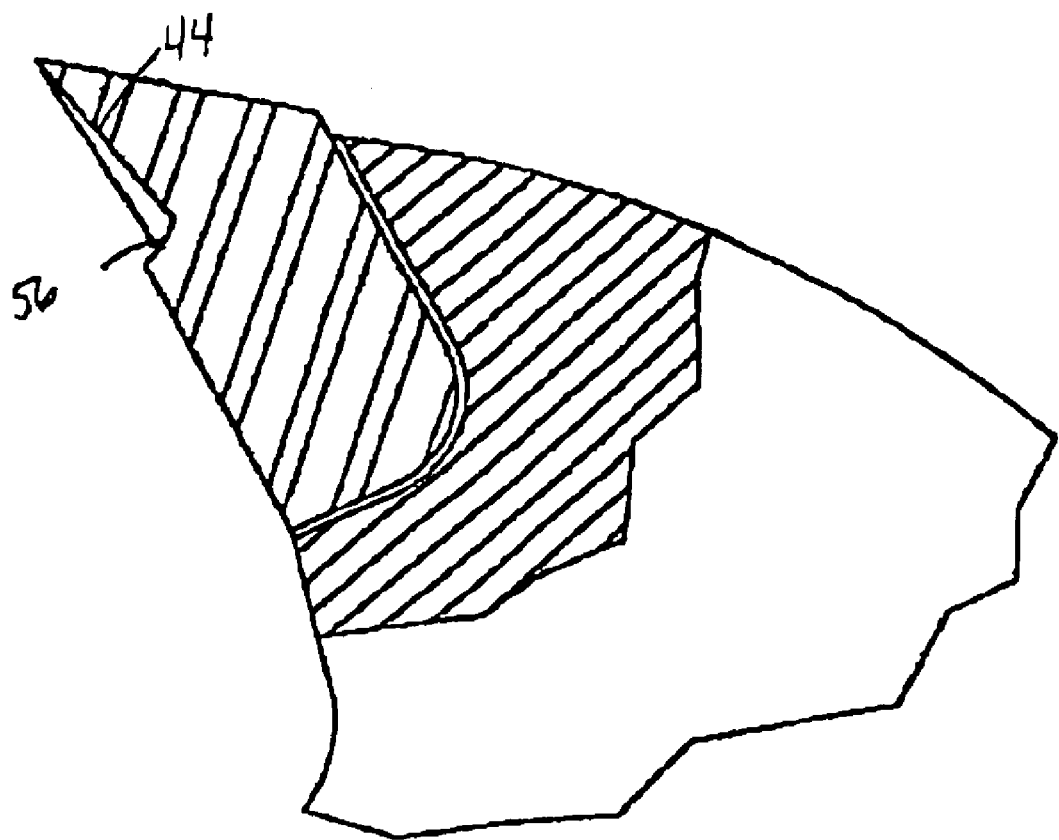
FIG. 15 is a cross section of the saw blade tooth of FIG. 14.

A wide variety of dimple configurations could be used in a number of alternatives as shown in FIGS. 14–17. For example scallop dimple 44 is shown in FIGS. 14 and 15.

Figure 16:
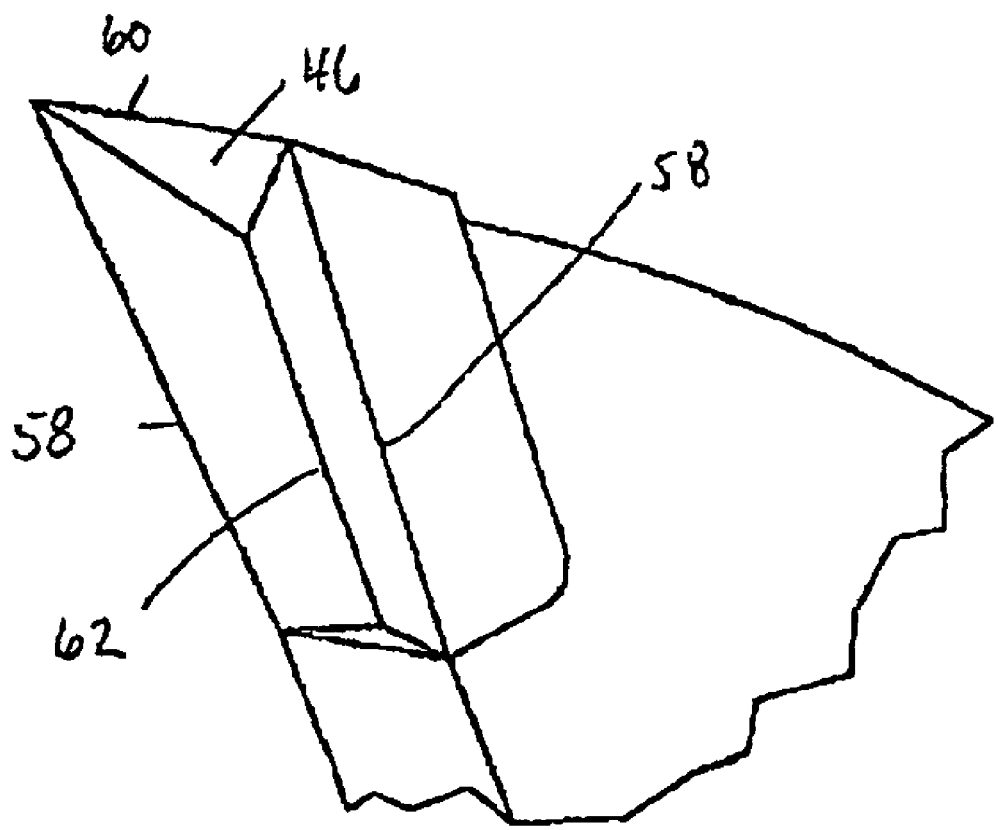
FIG. 16 is a perspective view of a fourth alternative saw blade tooth having an elongate three sided linear dimple.
Figure 17:
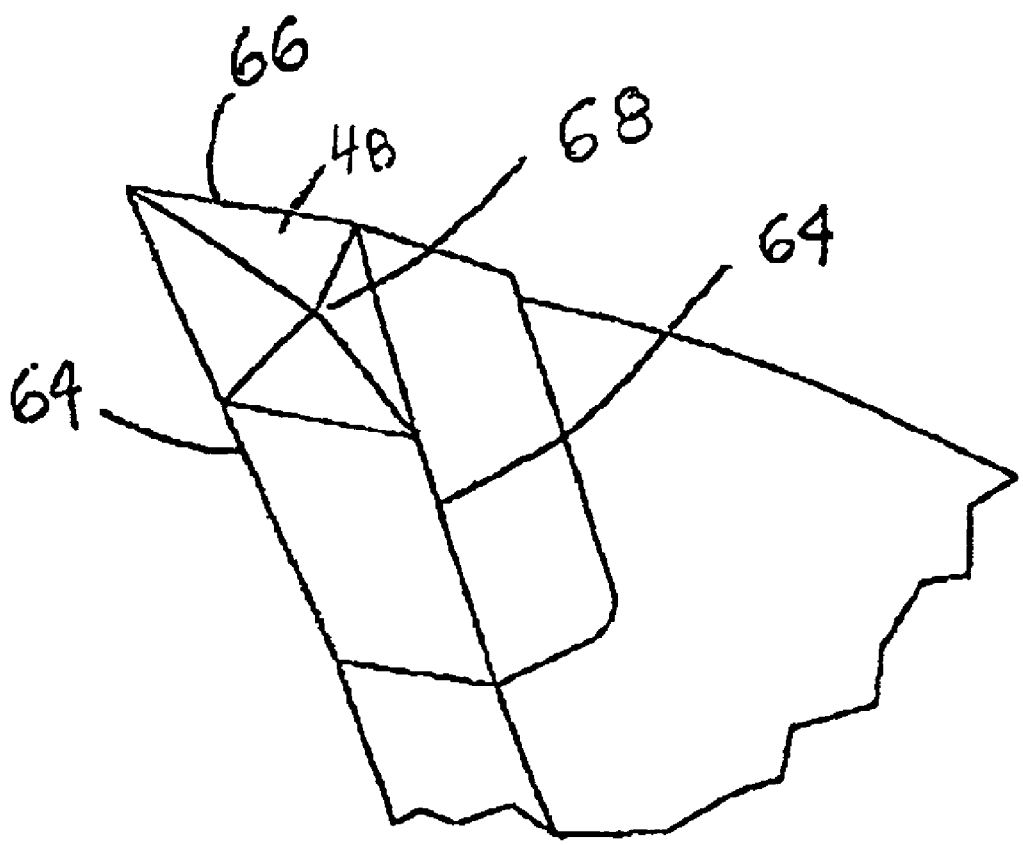
FIG. 17 is a perspective view of a fifth additional alternative saw blade tooth having a pyramidal four sided linear dimple and a straight leading edge.

Scallop dimple 44 is somewhat similar to that shown in FIGS. 12 and 13 but it includes a lower step 56. A centre line 45 is shown on figure 14. The centre line defines a central plane that goes through the centre of the dimple 44, the centre of the tooth 12 and the centre of the blade 10 and is parallel to the opposing sides of the blade 10. It will be appreciated that all of embodiments could have a similar centre line shown thereon. An elongate linear three sided dimple 46 is shown in figure 16 which has generally straight sides 58 and a generally straight leading edge 60 that meet at a generally straight recessed line 62. An inverse pyramid shaped dimple 48 is shown in figure 17. Inverse pyramid shaped dimple 48 is somewhat similar to that shown in figure 16 and it includes straight sides 64, a straight leading edge 66 that meet at an apex 68.

It will be appreciated by those skilled in the art that the alternate dimples described herein are all configured to have a sharp leading edge. Further the teeth have sides that slope inwardly and tops that slope downwardly so as to reduce the friction or drag during use. The teeth may be attached either generally upright as shown in FIGS. 1–10 or inclined as shown in FIGS. 11–17 but in either orientation the tooth is arranged such that it has a positive rake.

It has been recognized that by forming a curved cutting edge on the tooth, the sharp points and their wear and breakage of prior art teeth has been reduced. Further, it has been recognized that the resulting teeth described herein have stronger and more wear resistant cutting edges that can endure longer usage between sharpenings or that can be used in more demanding applications, as in cutting more abrasive materials. Further, it is recognized that by locating an arcuate dimple inside the curved edge of the tooth, a particularly sharp edge is created at the cutting edge.

It will be appreciated that the above description related to embodiments by way of example only. Many variations on the invention will be obvious to those skilled in the art and such obvious variations are within the scope of the invention as described herein whether or not expressly described.

What is claimed as the invention is:

1. A circular saw blade comprising:
    a generally circular blade portion having a width and a central plane through the centre of the width of the blade portion and being parallel to the opposing sides of the blade;
    a plurality of spaced apart teeth attached to the circular blade portion, each tooth having a width and each tooth extending outwardly and upwardly from the circular blade portion, having a leading edge, a leading plane and a dimple formed therein proximate to the leading edge, the dimple having a dimple leading edge, a dimple leading edge plane, a top upwardly curved portion and a surface that is shaped inwardly from the top curved portion forming a curved plane and the tooth having a positive rake defined by the dimple;
    a curved cutting edge defined by the leading edge of the tooth and the dimple leading edge; and
    a top cutting angle is defined by the tooth leading plane and the dimple leading edge plane, the top cutting angle varies along the width of the tooth, the angle increasing to a maximum as it approaches the central plane from opposed sides of the circular blade portion, the tooth leading plane being generally constant along the width of the tooth and the dimple leading edge plane varying along the width of the tooth such that a first too cutting angle taken adjacent to one of the opposed sides of the circular blade portion and parallel to the central plane is less than second top cutting angles taken spaced more closely to and parallel to the central plane and wherein the positive rake is provided by the variable top cutting angle.

2. A circular saw blade as claimed in claim 1 wherein the leading plane is inclined forwardly and wherein the positive rake is further provided by the forward inclination of the tooth.

3. A circular saw blade as claimed in claim 2 wherein the positive rake is in a range between about 20 and about 45 degrees.

4. A circular saw blade as claimed in claim 3 wherein the positive rake is about 40 degrees.

5. A circular saw blade as claimed in claim 1 wherein each tooth defines a cutting radius and a tooth top and a relief angle is defined by the cutting radius and the tooth top and the relief angle is between about 5 and about 15 degrees.

6. A circular saw blade as claimed in claim 5 wherein the relief angle is about 12 degrees.

7. A circular saw blade as claimed in claim 5 wherein each tooth has a lateral side and the blade portion has a plane and a lateral clearance angle is defined by the tooth lateral side and a plane from the leading edge parallel to the plane of the blade portion and the lateral clearance angle is between about 1.5 and about 5 degrees.

8. A circular saw blade as claimed in claim 7 wherein the lateral clearance angle is about 2.5 degrees.

9. A circular saw blade as claimed in claim 1 wherein the positive rake is in a range between about 20 and about 45 degrees.

10. A circular saw blade as claimed in claim 9 wherein the positive rake is about 40 degrees.

11. A circular saw blade as claimed in claim 1 wherein each tooth defines a cutting radius and a tooth top and a relief angle is defined by the cutting radius and the tooth top and the relief angle is between about 5 and about 15 degrees.

12. A circular saw blade as claimed in claim 1 wherein each tooth has a lateral side and the blade portion has a plane and a lateral clearance angle is defined by the tooth lateral side and a plane from the leading edge parallel to the plane of the blade portion and the lateral clearance angle is between about 1.5 and about 5 degrees.

13. A circular saw blade as claimed in claim 1 wherein the dimple is generally hemispherical shaped.

14. A circular saw blade as claimed in claim 1 wherein the dimple is generally conical shaped.

15. A circular saw blade as claimed in claim 1 wherein the dimple is generally hemispherical shaped with truncated sides.

16. A circular saw blade as claimed in claim 1 wherein the dimple is generally shell shaped.

* * * * *